Nov. 6, 1962 W. D. ARMSTRONG 3,062,320
VEHICLE ENGINE-POWERED LUBRICATING DEVICE
Filed Feb. 14, 1961 2 Sheets-Sheet 1
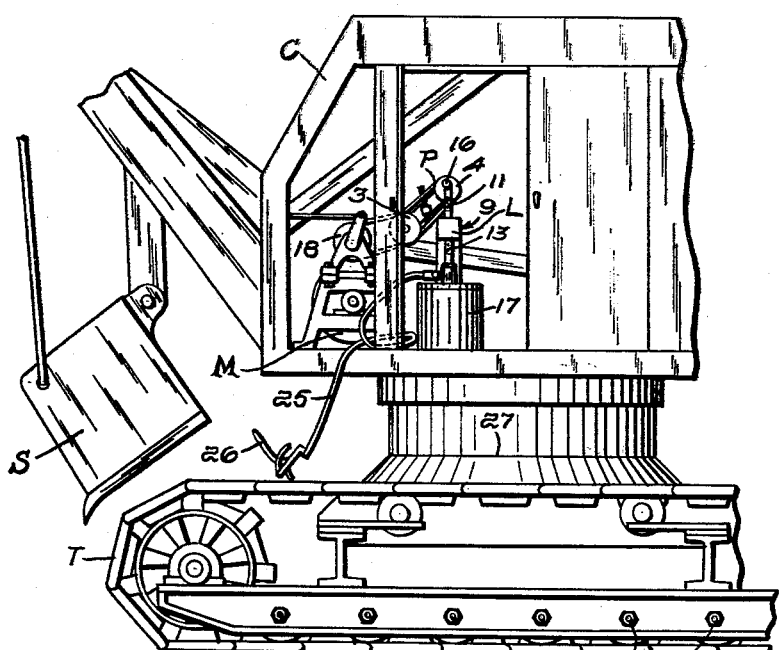
Fig. 1.
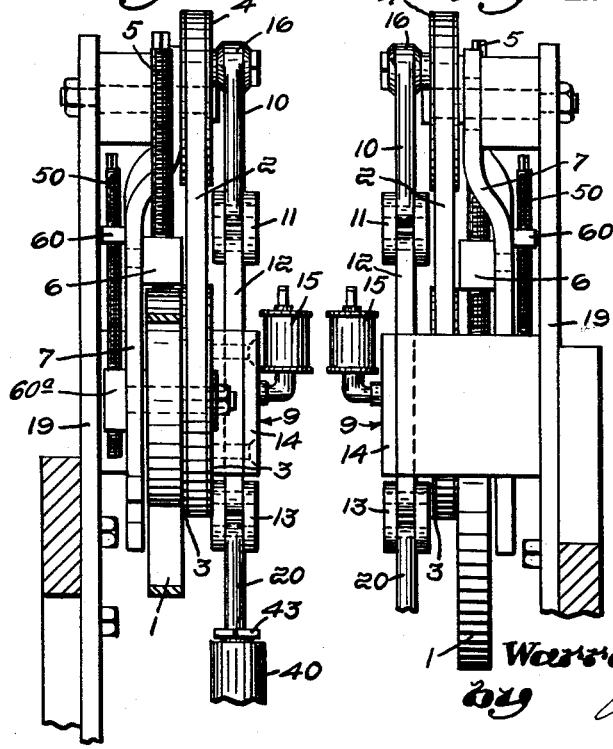
Fig. 3. Fig. 4.
Inventor:
Warren D. Armstrong,
by
Attorney

United States Patent Office 3,062,320
Patented Nov. 6, 1962

3,062,320
VEHICLE ENGINE-POWERED LUBRICATING DEVICE
Warren D. Armstrong, South Weymouth, Mass., assignor of twenty-five percent to Alexander A. Will and D. Forbes Will, Milton, Mass.
Filed Feb. 14, 1961, Ser. No. 89,200
3 Claims. (Cl. 184—7)

This invention relates to new and useful improvements in lubrication means for vehicles of the very heavy type such as shovels, derricks, hoisting machines, etc., employed in road construction. More particularly, the present invention is directed to the powering system of grease lubricating mechanisms for use in heavy automotive machines which include rotating cabs mounted upon tractor bases wherein large quantities of lubricants, such as greases, are necessary in their daily operations.

This invention contemplates the provision of a lubricating system for such heavy road-making automotive machinery for use in road building which includes shovels, derricks, hoisting machinery, etc., and which usually comprise upper operating means which swivel around a base. The latter in itself does not rotate, but forms the traction mechanism of such machinery. It will be readily apparent that the type machinery of the present invention is extremely heavy and expensive, requiring daily greasing in its rotating driving mechanism and all its moving parts, and in which large quantities of lubricants such as grease are necessary for the proper, smooth and economical operation thereof. The periodically repeated replenishment of large quantities of grease to the various operating parts of such vehicles is particularly necessary in heavy duty equipment of the swiveling, hoisting and shovelling types which often require 20 to 60 pounds of grease weekly to the traction base area alone. In the automotive machinery hereinbefore described, the traction engine is mounted in a cab, the latter in turn being mounted upon a swivel with respect to the traction base. Use of this type of machinery usually requires relatively unlimited angular rotation of the cab about the swivel. And the motor which is used to power the traction mechanism when the cab is in a predeterminedly fixed relation to the former, is also used to power the working mechanism (i.e. the shovel, hoist, etc.) when unclutched from the traction mechanism.

Thus, heretofore the greasing operation of this class of automotive equipment has been effected by compressed-air type, grease pumps carried apart from the machine or by hand pumping the grease from a tank located on the machine. In the former instance, the pumps usually required their own compressor, motor and tractor, thereby creating substantial expense. In the latter instance, the operator was hindered with the daily chore of hand pumping extremely large and heavy quantities of lubricant.

It has been suggested that the traction engine of automotive vehicles can be employed to power grease pumps for lubricating operating elements of the vehicles. For instance apparatus for this purpose is taught by both U.S. Patent No. 2,823,768 issued February 18, 1958 to C. R. Taylor and U.S. Patent No. 1,900,745 issued March 7, 1933 to E. L. Sutter. However, in both patents the engine is mounted directly and relatively freely with respect to the traction elements such as wheels. Neither device could be readily adapted for use with a motor mounted in a swiveling cab, for the provision of fixed grease lines would be impossible and the high pressures required to pump grease in heavy equipment renders the use of anything but pressure-tight lines impracticable.

Therefore, an object of the present invention is to provide new and improved lubricating means powered from the motor vehicle itself so that large quantities of grease could be readily and conveniently supplied to various moving and operating parts of shovels, hoisting, derrick machines, etc., and especially to the rotating upper section contact areas with the base traction section of said vehicles and to the traction mechanism itself.

Another object of the invention is to provide a vehicle engine-powered lubrication system supplying grease, or the like, in varying large or small quantities from a single large reservoir of the same to all moveable parts of said vehicle so that the operator is enabled to quickly and efficiently grease all said parts without expending the time and energy usually required to supply a constant available flow of grease in situ of the vehicle itself.

More particularly, it is an object of this invention to provide a pressurized grease reservoir attached and powered from the cab-mounted vehicle engine of the swivelling hoists and shovel-type automotive vehicles and which is adapted for supplying large and heavy quantities of grease at the will of the operator thereof and in varying quantities as required.

Other objects of this invention will be readily apparent from a more detailed description of the invention when taken in connection with the accompanying drawings in which:

FIGURE 1 is a partial side view of a crane-type shovel showing the general relationship of the powered greasing mechanism to the entire vehicle.

FIGURE 3 is a side view taken on lines 2—2 of FIGURE 2 in the direction of the shown arrows.

FIGURE 4 is a side view taken on lines 3—3 of FIGURE 2 in the direction of the shown arrows.

Figure 2:
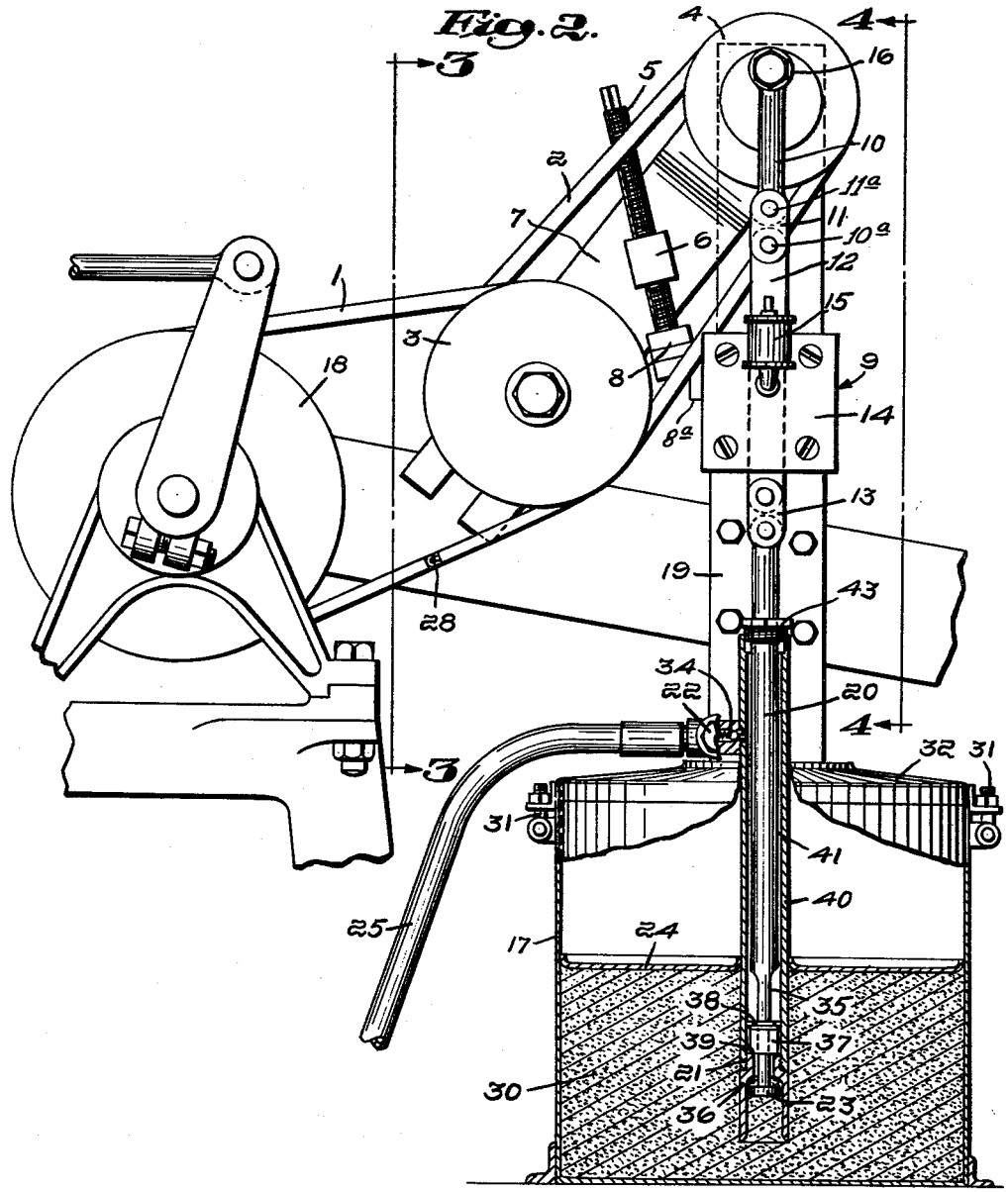
FIGURE 2 is a side elevation of the powered-grease device itself partly in section.

Referring now in detail to the drawings wherein like numerals denote like parts, there is diagrammatically shown in FIGURE 1 one embodiment of the invention which comprises generally a shover-type, tractor vehicle having an upper operating portion comprising a cabin enclosure or cab C and a power tool, such as shovel S associated therewith. Cab C, shown partially in open view is rotatably mounted upon an automotive portion or tractor base T, being adapted to swivel with respect to the latter as about 27. As is well known in the art, power for advancing the vehicle by operation of tractor base T, for operating shovel S, and for rotating the upper operating portion with respect to the tractor base, is provided selectively from a single source as through known clutch means from a motor or engine M mounted interiorally of cab C and moveable therewith. Lubricating means for greasing the moving elements of the vehicle, particularly the moving elements of tractor base T such as bearings 89 of the bogey wheels of the tractor are, for the most part, mounted in and moveable with cab C.

The lubricating means of the invention, shown generally at L in FIGURE 1 are shown more particularly in FIGURES 2 to 4 inclusive. Referring particularly to FIGURE 2, there is shown means, such as power drum 18, for coupling the lubricating means with motor M (FIGURE 1), drum 18 being rotatable about a shaft selectively clutched by known means to engine M. In most vehicles of the type described, the engine is mounted upon the floor of cab C and hence occupies a comparatively low position. In order to reduce the number of parts to a desirable minimum, power drum 18 is simply coupled through the known clutch means to motor M and hence is disposed also at a comparatively low level in cab C. Power drum 18, in turn, is coupled to a pumping means described hereinafter, which pumping means is preferably of the vertical type. Hence power transmission means are provided for transmitting the rotation of the power drum in an upward direction so as to allow sufficient clearance to permit substantially vertical motion of a reciprocating pump. In the form shown, the power transmission means comprises a double pulley 3 connected to power drum 18 by endless flat belt 1, the latter being provided with a pin socket arrangement 28 for loosening or removing belt 1 from the power drum thus completely disconnecting the transmission means when desired. Double pulley 3 is connected to a portion such as a single pulley 4 of the pumping means as through V-belt 2. Pulleys 3 and 4 are secured to angle adjusting plate 7 which may be raised (loosened) or lowered (tightened) by means such as adjusting screw 5 which is secured to angle clip 8 through the threaded adjusting screw bearing 6. Clip 8 is, in turn, secured to block 9 by bracket 8ᵃ. This power transmission means is preferred as it confers several substantial advantages. For instance, most cab-mounted motors are of comparatively low speed. Where the operation of the pumping means requires a large quantity, continuous explusion of grease, the speed of operation of the pumping means is substantially greater than the rotational rate of the motor. The transmission means hereinbefore described therefore provides a system whereby by reducing the sizes of pulley 3 over drum 18, and pulley 4 over pulley 3, the rate of operation of the pumping mechanism will be increased markedly over the rotational sped of motor M. Further, the available space in cab C of a vehicle of the type involved in the present invention is usually substantially restricted and a belt transmission means of the type described confers the substantial flexibility on the placement of various elements to conform to the critical requirements of the interior space of the cab.

V-belt 2 for driving pulley 4 is tightened or loosened for necessary adjustments or replacement by a similar arrangement as that provided for flat belt 1, i.e., an adjusting screw 50 secured to a bearing 60ᵃ through threaded screw block 60 pivotally mounted on plate 7 as shown in FIGURES 3 and 4. It is thus seen that bearing 60ᵃ moves in or out relative to pulley 4 by means of screw 50 the latter being threaded through block 60. Block 60 is pivotally mounted on plate 7 (see FIGURE 3).

The pumping means comprises an element 16 eccentrically mounted on pulley 4. Attached to element 16 is one end of an elongated, connecting rod 10 which is preferably disposed in an approximately vertical end downwardly extending position, the other end of rod 10 being attached to upper swivel link 11 at fixed pin 11ᵃ. Upper swivel link 11 in turn is pivotally connected to one end of elongated push rod 12 as at pivot pin 10ᵃ which passes vertically through bearings in steel block 9, the latter being fixed to back plate 19 as by side plate brace 14 to provide a vertical guide channel for the movement of rod 12. Means such as oiler 15 are included for providing lubrication for the bearings in steel block 9 thereby preventing binding as push rod 12 is moved through block 9. The other extremity of push rod 12 is pivotally connected to a portion such as upper section of swivel link 13. The lower section of link 13 in turn is connected to an elongated element such as cylindrical piston rod 20 which extends downwardly through packing such as nut 43 and into a substantially hollow cylinder 40. Rod 20 is preferably coaxially disposed within cylinder 40 and the rod and cylinder are so dimensioned as to provide a substantial clearance or space 41 between the outer cylindrical periphery of the rod and the internal cylindrical periphery of the cylinder. While the greater part of the length of rod 20 is substantially uniform in diameter, the other extremity thereof is tapered as at 35, the end of the taper extending through star spring 38 attached to sliding nut and valve 37 and terminates at a flared cylindrical portion such as piston 23. The cylinder 40 terminates adjacent spring 38 and nut and valve 37. This extremity of cylinder 40 is screw threaded and has fitted therein a cylindrical element such as piston housing 38 which provides a seat as at 39, for nut 37, also having a cylindrical internal dimension which is sufficiently greater than the diameter of piston 23 so as to allow a substantial clearance between the internal walls of housing 36 and the piston.

In order to support the pumping means heretofore described as well as to provide a grease reservoir, the invention includes container means such as tank 17 preferably mounted upon the floor of cab C. Cylinder 40 is adapted to extend through centrally apertured lid or cover 32 of tank 17 and through centrally apertured grease plate 24 under which grease 30 is stored. It should be noted that tank 17 is then in the form of a double compartmented container. Centrally apertured plate 24 preferably comprises a rather heavy metal element which loosely covers the top surface of grease 30 which exerts pressure upon the grease to prevent the formation of air bubbles therein as well as to provide a constant supply of grease.

Cylinder 40 has mounted thereon slightly above the top of tank 17 a check valve assembly 22 which extends substantially horizontally from and in open communication with space 41 within cylinder 40. As may be seen in FIGURE 2, check valve 22 is formed as a ball-check and spring assembly 34 which acts to close the valve on the up stroke of piston 23 and to open the valve on the downward stroke of the piston. Coupled to and in communication with valve 22 is grease conduit means such as grease hose 25 which is preferably of a length of approximately 20 feet or more which insures that the hose provides a grease path which will reach all bearings and fittings on the vehicle and particularly bearings 80 of the bogey wheels, rotating track areas, etc. of the vehicle. As shown in FIGURE 1, hose 25 terminates at its far end in a manually operable means, such as grease gun 26 for selectively delivering pumped grease to those fittings which the operator desires to lubricate.

In operation, power drum 18, deriving its power through a clutched shaft (not shown) connected to engine M of the vehicle in the cab C, drives double pulley 3 by flat belt 1 which is adjusted to a predetermined tension by screw 5. Double pulley 3, by virtue of V-belt 2, in turn drives pulley 4, the latter rotating attached eccentric element 16 and causing connecting rod 10 to reciprocate in an up and down manner. The reciprocation is imparted to rod 12 through upper link 11 to lower link 13 and to rod 20. The upward stroke of rod 20 closes check valve 22 and draws, by suction, grease into space 41 from tank 17 through valve 37 and from the clearance between piston 23 and piston housing 36. On the downward stroke of rod 20, valve 37 is closed and check valve 22 is opened. The pressure exerted by taper 35 against the grease in space 41 forces the grease entrapped therein through valve 22 and into hose 25 for expulsion when grease gun 26 is fired or open. When the grease gun is closed and therefore prevents the passage of grease through hose 25, pressure in space 41 will continue to build up offering substantial opposition to the downward motion of rod 20. By regulating the tension upon belt 1 in a predetermined manner, it will be seen that the belt will begin to slip as the flow of power from drum 18 is no longer transmitted to the pumping means. As long as the high pressure in space 41 continues, belt 1 will continue to slip until grease gun 26 is again open to allow expulsion of grease. Upon opening of the grease gun, the built-up pressure in the system is relieved to a point at which it is insufficient to cause opposition to the downward motion of rod 20 and the pumping mechanism resumes its normal functioning.

Expulsion of grease may be in small as well as large amounts. For a vehicle of the type described, comparatively small amounts of grease can readily be delivered, to, for instance, the fittings on the power shovel, while the system is fully capable of delivering the huge quantities of grease required, for instance, by the traction areas.

It is readily seen that a continuous powered system must be available at all times for the efficient and continued operation of the heavy machines of the present invention.

Since certain changes may be made in the above apparatus without departing from the scope of the invention herein involved, it is intended that all manner contained in the above description or shown in the accompanying drawings shall be interpreted as illustrative and not in a limiting sense.

I claim:

1. In automotive mechanisms having a tractor portion, an upper operating portion rotatably mounted on said tractor portion, and motor means mounted on said upper operating portion for selectively powering said portions, the combination therewith of lubricating means comprising grease container means fixedly mounted on said upper operating portion, pump means coupled with said motor means by drive means for pumping grease from said container means, at least one flexible, elongated delivery conduit connected to said pump means for delivering pumped grease to the tractor portion, said drive means comprising a pulley driven by a flat belt driven by a drum, said drum being driven by said motor means, said pulley having adjustable means connected thereto for adjusting the belt tension whereby said flat belt can slip on said pulley when the load thereon is increased due to lubricant pressure beyond the normal delivery pressure in said conduit.

2. The mechanism of claim 1 wherein said flat belt consists of a single length attachable around said drum and said pulley by means of a pin, said pin being removable for shutting down said pump means.

3. In automotive mechanisms having a tractor portion, an upper operating portion rotatably mounted on said tractor portion, and motor means mounted on said upper operating portion for selectively powering said portions, the combination therewith of lubricating means comprising grease container means fixedly mounted on said upper operating portion, pump means for pumping grease from said grease container means, power transmission means for coupling said motor means to said pump means for activating the latter, at lease one flexible, elongated delivery conduit for carrying pumped grease, one end of said conduit being coupled with said pump means to receive grease pumped by the latter from said container means, said power transmission means comprising a power drum coupled with said motor means for rotation with the latter, an intermediate double pulley mounted for rotation about an axis disposed substantially parallel with and at a small elevation with respect to the axis of rotation of said drum, a first flat belt for coupling said drum with said double pulley, means for adjusting the tension on said belt for slipping when the load thereon is increased beyond the normal delivery pressure in said conduit, a single pulley mounted for rotation about an axis disposed substantially parallel with and at a larger elevation with respect to the axis of rotation of said double pulley, a second V belt for coupling said double pulley with said single pulley, and means mounted eccentrically on said single pulley for coupling the latter with said pump means.

References Cited in the file of this patent

UNITED STATES PATENTS

| | | |
|---|---|---|
| 1,286,574 | Franklin | Dec. 3, 1918 |
| 1,592,021 | DeLew et al. | July 13, 1926 |
| 1,700,471 | Davis | Jan. 29, 1929 |
| 1,960,506 | Pfleger | May 29, 1934 |
| 2,544,812 | Thompson | Mar. 13, 1951 |
| 2,787,403 | Carr et al. | Apr. 2, 1957 |
| 2,823,768 | Taylor | Feb. 18, 1958 |